(12) United States Patent
Cameron et al.

(10) Patent No.: US 11,397,420 B2
(45) Date of Patent: Jul. 26, 2022

(54) SYSTEM AND METHOD FOR VISUAL STATE IDENTIFICATION OF AUTOMATION SYSTEMS

(71) Applicant: ATS AUTOMATION TOOLING SYSTEMS INC., Cambridge (CA)

(72) Inventors: Louis Ian Cameron, Cambridge (CA); Ehsan Shojaei-Baghini, Cambridge (CA); Stanley Wellington Kleinikkink, Cambridge (CA); Dennis Clifton Murray, Cambridge (CA)

(73) Assignee: AIS AUTOMATION TOOLING SYSTEMS INC., Cambridge (CA)

( * ) Notice: Subject to any disclaimer, the term of this patent is extended or adjusted under 35 U.S.C. 154(b) by 39 days.

(21) Appl. No.: 17/108,504

(22) Filed: Dec. 1, 2020

(65) Prior Publication Data

US 2021/0080934 A1 Mar. 18, 2021

Related U.S. Application Data

(63) Continuation of application No. PCT/CA2018/050989, filed on Aug. 15, 2018.
(Continued)

(51) Int. Cl.
*G08B 25/00* (2006.01)
*G05B 19/4155* (2006.01)
(Continued)

(52) U.S. Cl.
CPC ........ *G05B 19/4155* (2013.01); *G06F 3/14* (2013.01); *H05B 47/105* (2020.01); *G05B 2219/31368* (2013.01)

(58) Field of Classification Search
CPC ...... G05B 19/4155; G05B 2219/31368; G05B 19/048; G05B 23/02; G06F 3/14;
(Continued)

(56) References Cited

U.S. PATENT DOCUMENTS 9,983,011 B2 * 5/2018 Mountain ............ G01C 21/206
10,706,699 B1 * 7/2020 Kerzner ................. G06T 7/521
(Continued)

FOREIGN PATENT DOCUMENTS

EP 2863283 B1 10/2021

OTHER PUBLICATIONS

Supplementary Search Report, European Patent Office, on corresponding EP Application No. 18920212.0, dated May 16, 2022.

*Primary Examiner* — Anh V La
(74) *Attorney, Agent, or Firm* — Amarok IP Inc.; Neil W. Henderson (57) ABSTRACT

A system for visual state identification including: a visual display system including a plurality of light displays, each of the light displays provided to different physical locations on an automation system; an execution device operatively connected to the visual display system, including: an input device configured to receive data from the automation system; and computer readable instructions which, if executed by a processor, cause the processor to: receive input data; determine the state of the automation system based on the input data, wherein the state may include an area of interest related to one of the different physical locations; communicate with the visual display system to selectively light a portion of one or more of the plurality of light displays to display the state of the automation system and the physical location of the area of interest.

20 Claims, 5 Drawing Sheets

Related U.S. Application Data (60) Provisional application No. 62/679,092, filed on Jun. 1, 2018.

(51) Int. Cl.
*H05B 47/105* (2020.01)
*G06F 3/14* (2006.01)

(58) Field of Classification Search
CPC ........ H05B 47/105; G08B 7/064; G08B 5/38; G08B 13/04; G08B 13/19613; G08B 5/22; G08B 13/19608; G08B 15/00; G06T 7/20; G06T 7/521; G06T 2207/30232; G06V 20/52; G06V 40/20; H04N 9/3155; H04N 9/3147; H04N 9/3182; H04N 9/3185; H04N 9/3194
USPC ... 340/525, 815.4, 540, 686.1, 686.6, 691.1, 340/691.3, 691.6, 815.45
See application file for complete search history.

(56) References Cited

U.S. PATENT DOCUMENTS

| | | | |
|---|---|---|---|
| 2014/0266717 A1* | 9/2014 | Warren | G06Q 10/20 340/540 |
| 2014/0266764 A1* | 9/2014 | Henrie | G08B 13/04 340/691.1 |
| 2021/0080934 A1 | 3/2021 | Cameron et al. | |

* cited by examiner

SYSTEM AND METHOD FOR VISUAL STATE IDENTIFICATION OF AUTOMATION SYSTEMS

RELATED APPLICATIONS

This application is a continuation of PCT Application No. PCT/CA2018/050989, filed Aug. 15, 2018 and claims priority to U.S. Provisional Patent Application No. 62/679,092 filed on Jun. 1, 2018, which are hereby incorporated herein by reference.

FIELD

The present disclosure relates generally to a system and method for identifying the state of and assisting with diagnosing the state of automation systems. More particularly, the present disclosure relates to a system and method for providing a visual cue for identification of the state of the automation system.

BACKGROUND

Modern manufacturing and automation systems and processes are becoming more complex because these systems and processes are required to be fast, accurate and repeatable in order to provide appropriate product quality in short time frames. These systems and processes also seek to provide high machine efficiency with low downtime for maintenance, trouble-shooting and the like. For existing manufacturing and automation systems and processes, there is also a trend to provide on-going improvement in one or more of these factors in order to keep pace with the changing manufacturing environment.

Some manufacturing and automation systems have sophisticated technologies for identifying defects in products produced and, in some cases, will have the capability to stop the manufacturing or automation system until the issue/problem/fault can be identified. However, it can still be difficult to determine the cause or location of the defect or machine stoppage in order to remedy the issue/problem. This difficulty is, at least in part, due to the complexity, speed, and size of the manufacturing and automation systems in use today. Determining the cause and/or location of an issue/problem and navigating an operator toward the area can be particularly difficult for large systems that may have a small fault somewhere within the system.

As such, there is a need for improved systems and methods for identifying a location of an area of interest (such as a fault or stoppage or the like) in manufacturing and automation systems.

SUMMARY

According to one aspect herein, there is provided a system for visual state identification including: a visual display system including a plurality of light displays, each of the plurality of light displays provided to different physical locations on an automation system; an execution device operatively connected to the visual display system, the execution device including: an input device configured to receive data from the automation system; and computer readable instructions stored in a memory component which, if executed by a processor, cause the processor to: receive input data via the input device; determine the state of the automation system based on the input data, wherein the state may include an area of interest related to one of the different physical locations; communicate with the visual display system to selectively light a portion of one or more of the plurality of light displays to display the state of the automation system and the physical location of the area of interest.

In some cases, each different physical location may relate to a location on a perimeter of the automation system. In these cases, the plurality of light displays may be arranged along the perimeter and identified by each light display's location on the perimeter.

In some cases, the automation system may include a plurality of automation stations and each automation station may include a perimeter configured to identify different physical locations on the automation station.

In some cases, the visual display system may be configured to provide an animated path indication to a location of the area of interest of the automation system.

In some cases, the visual display system may be configured to provide a predetermined hue and illumination pattern to each of the plurality of light displays based on the state of the automation system and the location of the area of interest.

In some cases, the visual display system may include a plurality of light strings and the light strings may be configured to provide patterns associated with the state of the automation system and the location of the area of interest.

In some cases, the visual display system may be configured to provide for a background state of the automation system and a foreground area of interest of the automation station.

In some cases, the system may further include a convertor configured to relay visual cue instructions from the execution device to the visual display system.

In some cases, the visual display system may be configured to alter the level of brightness of each of the plurality of light displays and/or alter the frequency in which each of the light displays are lit.

According to another aspect herein, there is provided a method for visual state identification including: receiving input data from an automation system at a processor via an input device; determining, at an execution device, the state of the automation system based on the input data; communicating, by the execution device, with a visual display system to selectively light a portion of one or more of a plurality of light displays to display the state of the automation system and the location of an area of interest, wherein each of the plurality of light displays are associated with different physical locations on the automation system.

In some cases, each different physical location relates to a location on a perimeter of the automation system. In these cases, the plurality of light displays may be arranged along the perimeter and identified by each light display's location on the perimeter.

In some cases, the automation system may include a plurality of automation stations and each automation station may include a perimeter configured to identify different physical locations on the automation station.

In some cases, the visual display system may be configured to provide an animated path indication to a location of the area of interest of the automation system.

In some cases, the visual display system may include a plurality of light strings and the light strings may be configured to provide patterns associated with the state of the automation system and the location of the area of interest.

In some cases, the visual display system is configured to provide a background state of the automation system and a foreground area of interest of the automation station.

In some cases, the method may further include relaying, via a convertor, visual cue instructions from the execution device to the visual display system.

According to another aspect herein, there is provided a system for visual state identification of an automation system, the system including: a machine controller configured to monitor the automation system to determine a change in state of the automation system; an execution device configured to receive input from the machine controller related to the change in state and determine a visual cue related to the change in state and a perimeter location identification associated with the change in state; and a visual display system including a plurality of light displays wherein each of the light displays may include a location identification associated with the perimeter location identification and wherein the visual display system is configured to selectively illuminate each of the plurality of light displays based on the location identification and the change in state of the automation system.

Other aspects and features of the present invention will become apparent to those ordinarily skilled in the art upon review of the following description of specific embodiments of the invention in conjunction with the accompanying figures.

BRIEF DESCRIPTION OF FIGURES

Embodiments of the system and method will now be described, by way of example only, with reference to the attached Figures, wherein.

DETAILED DESCRIPTION

The following description includes detailed examples, however, it is to be understood that the disclosed embodiments are merely examples and that the systems and methods described herein can have alternate embodiments in various forms. Many modifications and variations will be apparent without departing from the scope of the description. Therefore, specific details disclosed herein are not to be interpreted as limiting, but merely as a basis for the claims and as a representative basis for teaching one skilled in the art to variously employ the present subject matter in various environments or applications.

Generally, the present document provides a system and method for providing visual cues with regard to the state of a manufacturing or automation system, for example, visual cues related to the location of faults, replenishments, warnings, stoppages, opened doors, or the like. Manufacturing or automated production lines may use one or more automation stations to handle manufacturing operations. An automation station may include a single machine in a production line, such as a press or the like, but may also include a complex system involving robots, conveyors, manipulators, and the like.

Figure 1:
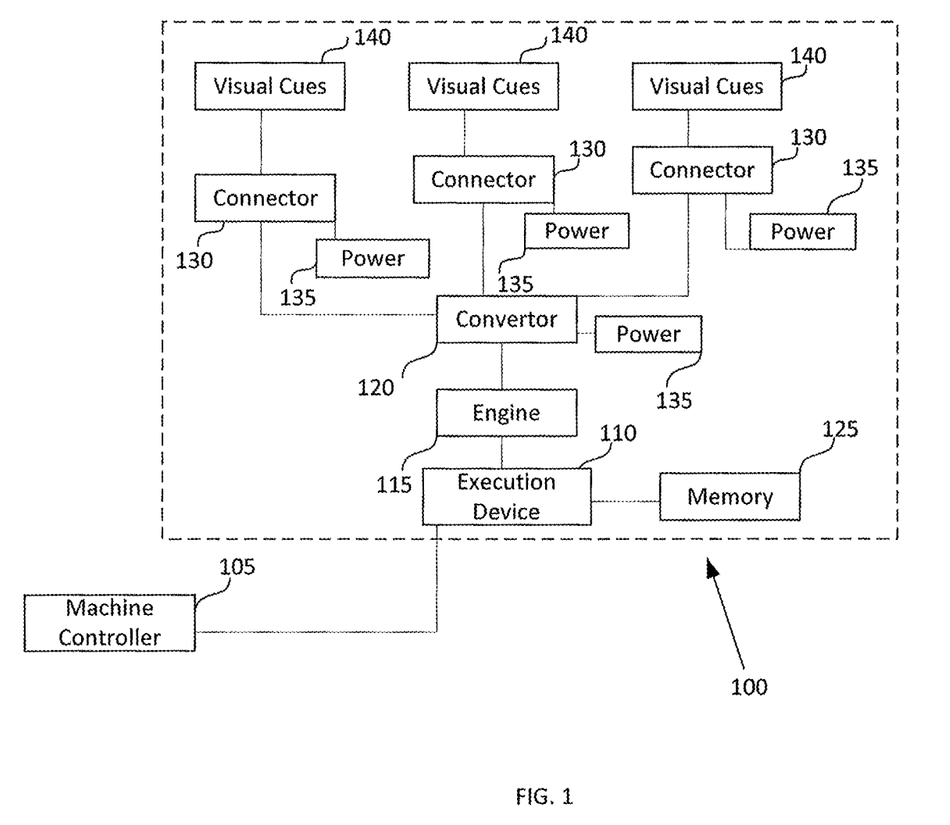
FIG. 1 is a block diagram illustrating an embodiment of a system for state identification in an example environment for the system.

FIG. 1 illustrates a system 100 for visual state identification. It will be understood that an automation system includes at least one automation station (not shown). Each automation station may include a machine controller 105, such as but not limited to a computer control system, or a programmable logic controller (PLC), which controls the automation station. Each machine controller 105 may be operatively connected to one or more execution devices 110, for example a guide light controller, a manufacturing execution system, or the like. The execution device 110 may include a processor and may provide control and monitoring of the automation system including a production line.

In some cases, the machine controller 105 may be operatively connected to the execution device 110 through, for example, a TCP/IP connection. Other connections that allow the system 100 and the machine controller 105 to transfer data may also be possible.

The execution device 110 is configured to capture states or categories associated with the automation system or may receive the states as input from the machine controller or through another input component. The execution device 110 may be operatively connected to a visual display system comprising a light engine 115, a convertor 120; a connector 130; a memory component 125, a light display system, and at least one processor.

The light engine 115 is configured to receive a state update from the execution device 110 (for example, in real time) and drive visual cues 140 of the light display system. These visual cues 140 can help operators identify a location associated with a fault or stoppage (also referred to as "visual fault locators"). In some cases, the visual cues 140 may be, for example, a plurality of colored LED lights, for example, an LED strip, LED string, a scrolling LED display, or the like, and the light engine 115 may communicate with the LED lights to set a colour value, for example an RGB value, and a frequency value for each of the plurality of LED lights. As each LED may have a particular address associated with it, the system 100 may highlight a location of interest on the automation system with a high degree of accuracy in real time or almost real time.

The light engine 115 may be operatively connected to the convertor 120, sometimes referred to as a router, wherein the convertor 120 is configured to convert the signal to be received by the light display system, using various communication protocols to convert the signal to control the visual cues 140. The convertor 120 is configured to provide output from the visual display system to the light display system. In some cases, the signal may be sent by UDP. The convertor 120 is intended to provide control over the lights, in order to ensure the colour and frequency of the visual cues 140 reflect the current state or category of the automation system. In some cases, the convertor 120 may be connected to power 135, for example an AC outlet or the like.

The execution device 110 may determine the hues and animation patterns of the lights via a memory component 125 which is intended to store animation patterns associated with various states or categories of automation systems, for example, operational, fault, door open, warnings, replenishments, upstream or downstream blockage, power off, starved, or the like. The memory component 125 may further store machine geometry, for example, the location of the various automation stations and production line components in the automation system.

The convertor 120 may be connected to at least one connector 130, sometimes referred to as a driver, which is configured to connect the convertor 120 with the light display system. The connector 130 may be connected to a power source 135 that may be the same or a different power source than the convertor. The connector 130 is configured to provide pixel data to the visual cues 140 via, for example, Cat 6 cables or the like. Each connector may be connected to the visual cues 140 via extrusion channels. The extrusion channels may come in various forms and shapes and may be sized to house the corresponding visual cue. The extrusion channels may house a string or a plurality of strings of coloured lights, for example, LEDs.

Figure 2A:
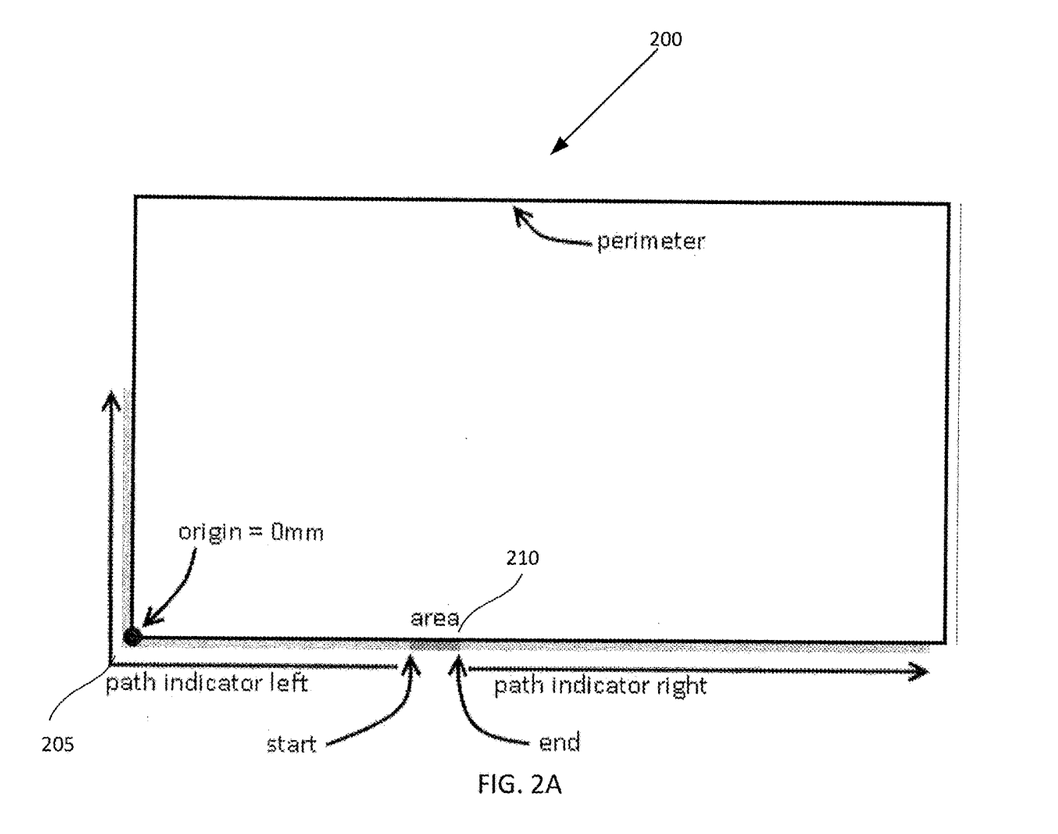
FIG. 2A illustrates a perimeter path according to an embodiment.

In some cases, the visual cues 140 housed in the extrusion channels are intended to run a perimeter of the automation system 200 as shown in FIG. 2A. The visual cues may be determined from a specific area or point on the perimeter, such as, for example, from an origin 205. A location of interest 210, for example a location with a state update, is illuminated by a visual cue. In a specific example where a fault is detected, the area 210 may highlight the fault and the location of interest 210 may be illuminated in red and the visual cues in the extrusion channels may provide for a path towards the fault area via a frequency of lighting. The perimeter is intended to encompass the outer edge of an automation station (e.g. a machine or the like) and may include a start and end position relative to the origin 205 of the perimeter. Positions along the perimeter may be defined, for example, by an increase in value from left to right with the origin being 0 mm position of the perimeter.

Figure 2B:
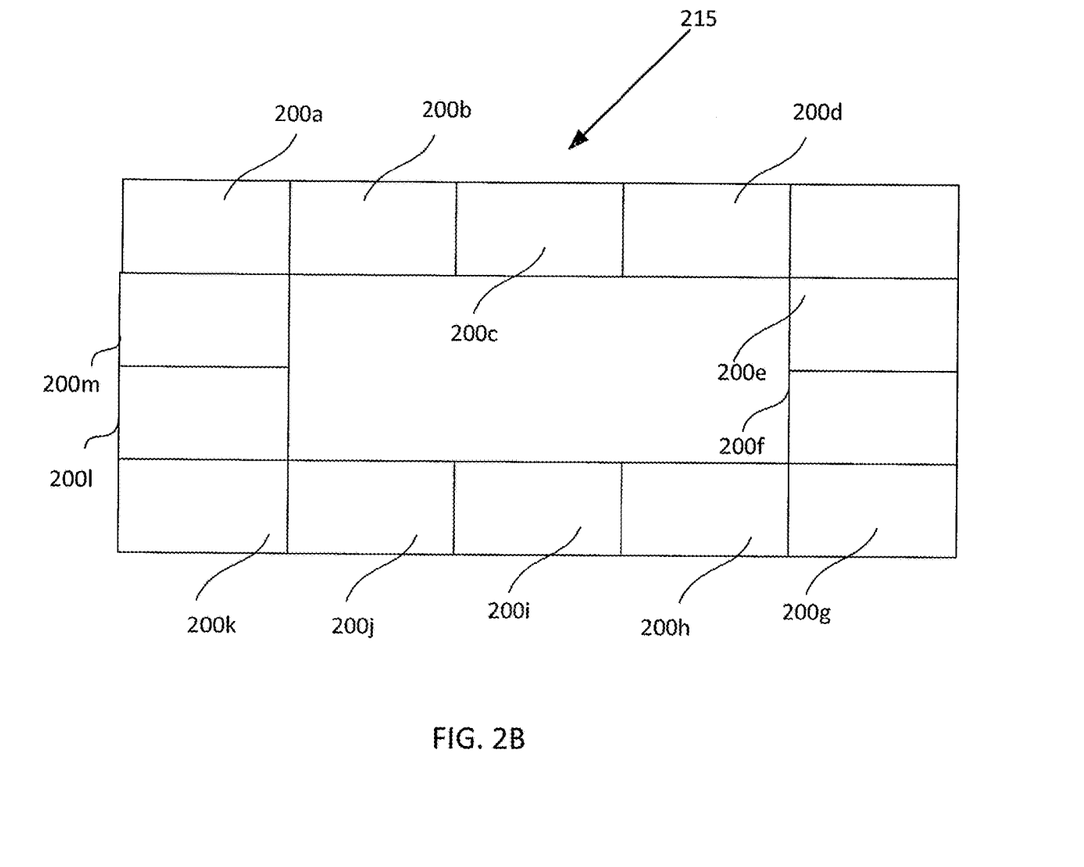
FIG. 2B illustrates a plurality of perimeters in an automation system.

In some cases, each equipment identification (ID) defined in a hardware configuration may have a separate perimeter and an associated perimeter equipment ID. In these cases, an automation system, manufacturing system or production line 215 may include multiple perimeters 200a to 200m each identified by a separate perimeter equipment ID, as illustrated in FIG. 2B. It will be understood that more or less equipment may be in an automation system, manufacturing system or production line.

As the perimeter is also intended to provide for modularity of the automation system. The perimeter may be easily reconfigured if equipment is added or removed from the automation system. The perimeter may continue to have the same origin but may populate based on the hardware or equipment position within the automation system. The system may translate the perimeter into a straight line and may insert and remove parts of the line as equipment is added or removed. Further, the visual cues may be addressed and tied to a location and associated equipment and may also be inserted and removed as the equipment is reconfigured.

The light display system may include various background display areas, for example background display areas on a scrolling LED display, in addition to foreground display areas. The background and foreground display areas may provide operators with different types of information about the automation system, such as a general state of the automation system, a specific state of the automation system, a general state of a cell, a specific state of a cell or the like. The background display areas may be set to active or inactive via, for example, the machine controller. Each area may have a unique identifier which may be associated with the perimeter equipment ID. The background display areas may provide additional information about the automation system.

In some cases, for example, a background display area may include a visual cue region that changes colour depending on a general state of the connected cell, location of the automation system or its proximity to a location of interest. The general state of a cell may include, for example, running, faulted, off, or the like. A background state or category may be saved in the memory component 125 and may be the appearance of the background display area for each possible cell state. A background state may direct attention to a location of interest. A location of interest may also include a foreground region that highlights a specific state, such as, a guard door open, a warning, station fault, or the like. A location of interest category may define the appearance of the foreground location when the state of an area is active.

Locations of interest may override a background region's colour assignment. Background areas may also include an animated path indication, which may guide an operator to a location that requires further attention, for example, a fault, an open door, an outage, or the like.

In some cases, the system may provide an ability for an operator to override a current state and set a location as active. This may be beneficial for testing the system or for manually instigating a status override or request for an assistant. A user interface may be incorporated with the system and provide the ability for the operator to override the current state.

Figure 3A:
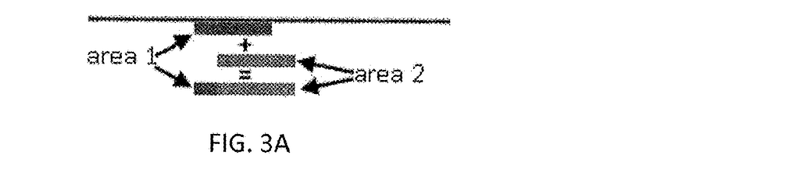
FIGS. 3A and 3B illustrate overlapping path indications.
Figure 3B:
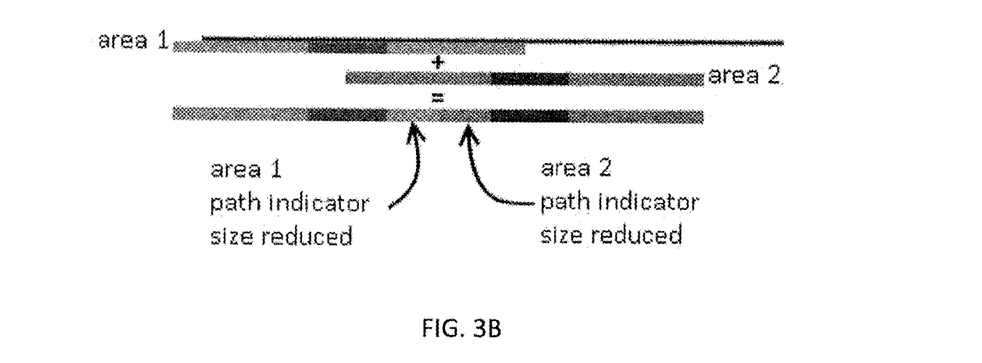

FIG. 3A illustrates a case in which two locations of interest have active state updates. In some cases, the engine 115 may determine which priority is more urgent and may allow the more urgent priority to span the overlap. If the priorities are equal, the engine may determine, for example, to allow a left region to overlap the right region or, as in FIG. 3B, to have each priority overlap equally, which may include reducing the size of the location indicator or the path indicator accordingly.

Various states or categories may be assigned to each background area which are intended to provide for a collection of shared appearance and behavior. States or categories could be defined as, for example: station fault, door open, emergency stop pressed, low level, high level, warnings, or the like. When multiple categories are appropriate for a background area, in some cases only the top priority category or state will be shown. In other cases, the area might rotate between visual cues to illustrate all active categories for the area. In still other cases, there may be multiple strings of visual cues allowing for multiple states to be displayed simultaneously.

The visual cues may include pre-defined hues, and may also include various levels of brightness and frequency of display depending on the determined category. Further, the intensity of the visual cue, for example the LED intensity, may be ramped on and off on a predetermined interval. In some cases the predetermined interval may be a short flash on followed by a flash off of equal timing. In some cases, the system may include a plurality of light strips that allow for the creation of two dimensional patterns or pictures. For example, the patterns may include arrows or other indications as to the direction, location, status or other aspect of the visual fault that may be of interest. It will be understood that when the flash is off, the light intensity will be 0%.

The visual cues may further include a predetermined ramp up time, the time it takes for the visual cue to change from an off position to full brightness. The visual cues are further intended to have path settings, which may include, for example, a length of a path, a distance between path indicators and a path speed. The path settings are intended to allow the visual cues to appear to travel around the perimeter to direct the operator to the location experiencing a fault or other category that would require an operator's attention. If no area is in need of attention, the visual cues may include an all clear setting, for example a green setting, that would flash or otherwise be displayed around the perimeter.

Background areas are regions of the perimeter that are intended to change colour when state change events are detected. In some cases a background area may be defined for a single equipment ID, or a single equipment ID may include multiple background areas.

In a specific example, the visual cues may be a single LED strip or a plurality of LED strips on a flexible circuit board populated by surface mounted light-emitting diodes. A plurality of LED strips may be connected to a single convertor 120. A unique node number may be used to communicate the LED RGB value to each LED strip and each LED strip may contain a start position and end position relative to the perimeter's origin.

In some cases, an operator may have an ability to force an area state. For example, a maintenance worker or the like may force an area into a stop state when working on the area. When the force state is removed, the area state may revert back to the previous state.

Figure 4:
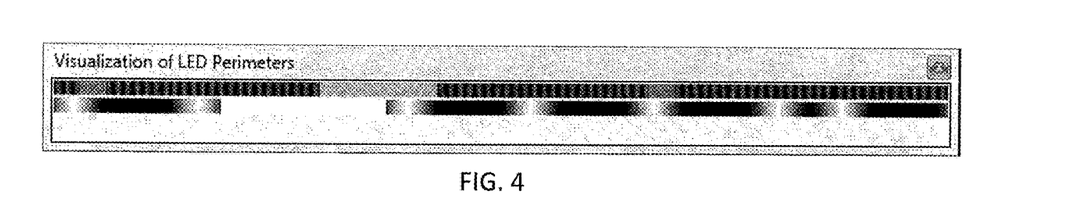
FIG. 4 illustrates a debug visualization.

FIG. 4 illustrates a visualization window tool which is intended to draw each perimeter into a window form which can be displayed on an operator's display. The display may be associated with a computer, a tablet, or other device. The visualization is intended to allow the operator to view areas, and may also provide an ability to, for example, test areas, test equipment state controller codes, setup configurations, and the like. The visualization window tool may aid in visualizing and verifying the system functionality. The visualization may be monitored and may display areas of interest in a similar manner to the physical system.

The system is intended to have predetermined patterns to provide visual cues for the state of the automation system. In a specific case, the patterns may be defined as follows:
  i. green solid visual to display the automation system and/or production line is running with no issues;
  ii. green with yellow bar moving towards a door, for example a wide strip moving steadily to a location or area, may indicate a low part level in that area and prompt operators to replenish stock. The width of the strip may be, for example, the length of the door;
  iii. green with white solid may indicate that upstream is starved and downstream is blocked, the start and end of the white section may illustrate the blockage area;
  iv. green flashing may show that the automation system or production line is waiting for a cycle start;
  v. slow flashing green may show that the system is running in economy mode, for example, to conserve energy or keep equipment at a selected operating temperature;
  vi. red flash may illustrated an unattended fault;
  vii. red solid may indicate an attended fault;
  viii. a red dot may be used to track a specific part in the machine and may be used in troubleshooting or debugging;
  ix. red with motion to a door, wherein the width of the area is flashing red may indicate a section where the power is off and or guards closed; and
  x. red door may indicate that the door is open.

It will be understood that other patterns and colors may be used, and other states may be defined for the system.

In another specific example, the categories for each background area may include the following: invalid, running, cycle stopped, unattended fault, attended fault, power off, blocked and starved. Each category may include a visual colour cue, an intensity and predetermined flash settings. An example is provided in table 1 below.

TABLE 1

| Description | Colour | Intensity % | On/Off | Flash On (ms) | Flash Off (ms) | Ramp (ms) |
|---|---|---|---|---|---|---|
| StateInvalid | White | 50 | On | 350 | 350 | 200 |
| Running (Automatic) | Green | 20 | Off | | | |
| Cycle Stopped (Manual Mode) | Green | 20 | On | 350 | 350 | 200 |
| Unattended Fault | Red | 50 | Off | | | |
| Attended Fault | Red | 20 | Off | | | |
| Power Off | White | 20 | Off | | | |
| Stuffed | Yellow | 20 | Off | | | |
| Starved | Yellow | 20 | Off | | | |

Each background area may include a description and a start and end position as shown in table 2.

TABLE 2

| Description | Equipment | Position Start (mm) | Position End (mm) |
|---|---|---|---|
| C10 Tray Unloader | Cell 10 | 0 | 1000 |
| C20 Tray Sealer | Cell 20 | 1001 | 2000 |
| C10 Tray Unloader | Cell 10 | 2001 | 3000 |

In this example, area category definitions may also be predefined by the system. In this case, each area category may include a priority level, colour, intensity, flash settings, and motion settings. An example of these definitions is shown in table 3 below

TABLE 3

| Description | Priority | Colour | Intensity % | Flash On/Off | Flash On (ms) | Flash Off (ms) | Flash Ramp (ms) | Motion On Length (mm) | Motion Off Length (ms) | Motion Speed (mm/s) |
|---|---|---|---|---|---|---|---|---|---|---|
| E-Stop | 100 | Red | 30 | Off | | | | | | |
| Door Open | 90 | Red | 30 | Off | | | | | | |

TABLE 3-continued

|  |  |  |  | Flash | | | Motion | | |
| --- | --- | --- | --- | --- | --- | --- | --- | --- | --- |
| Description | Priority | Colour | Intensity % | Flash On/Off | On (ms) | Off (ms) | Ramp (ms) | On Length (mm) | Off Length (ms) | Speed (mm/s) |
| Door Fault | 80 | Red | 30 | On | 350 | 350 | 100 | 200 | 100 | 300 |
| Warning | 70 | Amber | 30 | Off | | | | | | |

Location of interest definitions may be included to provide the system with details as to the machine controller. In some cases, the location of interest definitions may include the equipment, area ID, category, start position, end position, motion identification as shown in table 4.

TABLE 4

|  |  |  |  | Position | | Motion Length | |
| --- | --- | --- | --- | --- | --- | --- | --- |
| Description | Equipment | Area ID | Category | Start (mm) | End (mm) | Left (mm) | Right (mm |
| Door 1 Open | Cell 10 | 1 | Door Open | 100 | 200 | 0 | 0 |
| Door 2 Open | Cell 10 | 2 | Door Open | 300 | 400 | 0 | 0 |
| Door 3 Open | Cell 10 | 3 | Door Open | 500 | 600 | 0 | 0 |
| Door 4 Open | Cell 10 | 4 | Door Open | 700 | 800 | 0 | 0 |
| Door 1 Open | Cell 20 | 1 | Door Open | 1100 | 1200 | 0 | 0 |
| Door 2 Open | Cell 20 | 2 | Door Open | 1300 | 1400 | 0 | 0 |
| Door 3 Open | Cell 20 | 3 | Door Open | 1500 | 1600 | 0 | 0 |
| E-stop 1 | Cell 10 | 11 | E-stop | 200 | 250 | 0 | 0 |
| E-stop 2 | Cell 10 | 12 | E-stop | 450 | 500 | 0 | 0 |
| E-stop 3 | Cell 10 | 13 | E-stop | 750 | 800 | 0 | 0 |
| E-stop 1 | Cell 20 | 11 | E-stop | 1250 | 1300 | 0 | 0 |
| E-stop 2 | Cell 20 | 12 | E-stop | 1500 | 1550 | 0 | 0 |
| Door 1 Fault | Cell 10 | 21 | Door Fault | 100 | 200 | 300 | 300 |
| Door 2 Fault | Cell 10 | 22 | Door Fault | 300 | 400 | 300 | 300 |
| Door 3 Fault | Cell 10 | 23 | Door Fault | 500 | 600 | 300 | 300 |
| Door 4 Fault | | 24 | Door Fault | 700 | 800 | 300 | 300 |
| Door 1 Fault | Cell 20 | 21 | Door Fault | 1100 | 1200 | 300 | 300 |
| Door 2 Fault | Cell 20 | 22 | Door Fault | 1300 | 1400 | 300 | 300 |
| Door 3 Fault | Cell 20 | 23 | Door Fault | 1500 | 1600 | 300 | 300 |
| Warning 1 | Cell 10 | 31 | Warning | 400 | 500 | 0 | 0 |
| Warning 2 | Cell 10 | 32 | Warning | 650 | 750 | 0 | 0 |
| Warning 1 | Cell 20 | 31 | Warning | 1300 | 1400 | 0 | 0 |
| Warning 2 | Cell 20 | 32 | Warning | 1400 | 1500 | 0 | 0 |
| Warning 3 | Cell 20 | 33 | Warning | 1600 | 1700 | 0 | 0 |

The number of convertors 120 and an identifier, for example an IP address, may be included for each convertor in the system. In cases where LED strips are used, a number of LEDs and the length of the LED strip may be defined for each convertor 120 or connector 130. It will be understood that the specific example above illustrates only an example of possible settings, and the positions, settings, and other elements would change depending on the set up of the automation system and the visual cues the operators wish to receive regarding the operating state of the automation system.

Figure 5:
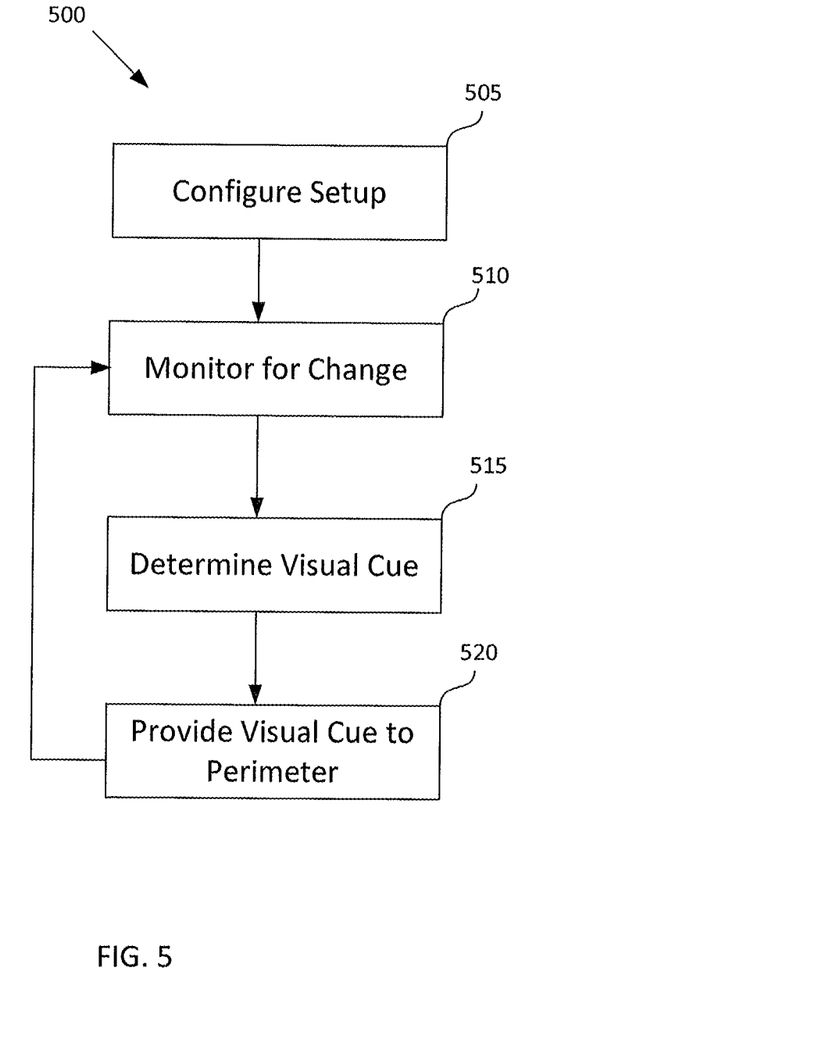
FIG. 5 is a flow chart illustrating an embodiment of a method for visual state identification.

FIG. 5 is a flow chart illustrating a method 500 for providing visual cues for state detection. At 505, the system may be configured based on the automation system set-up, the equipment and desired visual cues per state. It will be understood that the set-up of the system may be predetermined or may be configured after installation. The configuration may include the number of convertors and connectors required for the system, the background categories and areas, the area categories and locations, and the various patterns desired for the visual cues.

At 510, the machine controller and/or execution device monitors for a change of state, or a change of category in a specific area. When a change in category is determined, at 515, the visual cue associated with the category is determined. At 520, the visual cue is provided to the perimeter and area to allow for the area to be easily located and for the issue to quickly be determined to allow it to be fixed or attended to. Once the visual cue is provided to the perimeter, the system 100 may return to monitoring for a change in category, at 510, to determine when the visual cue can return to showing all is clear, or when another category has been determined and the visual cue should be updated.

In the preceding description, for purposes of explanation, numerous details are set forth in order to provide a thorough understanding of the embodiments of the invention. However, it will be apparent to one skilled in the art that these specific details may not be required in order to practice the invention. In other instances, well-known structures, modules and/or circuits may be shown in block diagram form in order not to obscure the embodiments of the invention. For example, specific details are not provided as to whether the embodiments described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope of the invention, which is defined solely by the claims appended hereto.

What is claimed is:

1. A system for visual state identification comprising:
a visual display system comprising a plurality of light displays, each of the plurality of light displays provided to different physical locations on an automation system;
an execution device operatively connected to the visual display system, the execution device comprising:
an input device configured to receive data from the automation system; and
computer readable instructions stored in a memory component which, if executed by a processor, cause the processor to:
receive input data via the input device;
determine the state of the automation system based on the input data, wherein the state may include an area of interest related to one of the different physical locations;
communicate with the visual display system to selectively light a portion of one or more of the plurality of light displays to display the state of the automation system and the physical location of the area of interest.

2. A system according to claim 1 wherein each different physical location relates to a location on a perimeter of the automation system.

3. A system according to claim 2 wherein the plurality of light displays are arranged along the perimeter and identified by each light display's location on the perimeter.

4. A system according to claim 1, wherein the automation system comprises a plurality of automation stations and each automation station comprises a perimeter configured to identify different physical locations on the automation station.

5. A system according to claim 1, wherein the visual display system is configured to provide an animated path indication to a location of the area of interest of the automation system.

6. A system according to claim 1, wherein the visual display system is configured to provide a predetermined hue and illumination pattern to each of the plurality of light displays based on the state of the automation system and the location of the area of interest.

7. A system according to claim 1, wherein the visual display system comprises a plurality of light strings and the light strings are configured to provide patterns associated with the state of the automation system and the location of the area of interest.

8. A system according to claim 1, wherein the visual display system is configured to provide a background state of the automation system and a foreground area of interest of the automation station.

9. A system according to claim 1, further comprising a convertor configured to relay visual cue instructions from the execution device to the visual display system.

10. A system according to claim 1 wherein the visual display system is configured to alter the level of brightness of each of the plurality of light displays.

11. A system according to claim 1 wherein the visual display system is configured to alter the frequency in which each of the light displays are lit.

12. A method for visual state identification comprising:
receiving input data from an automation system at a processor via an input device;
determining, at an execution device, the state of the automation system based on the input data;
communicating, by the execution device, with a visual display system to selectively light a portion of one or more of a plurality of light displays to display the state of the automation system and the location of an area of interest, wherein each of the plurality of light displays are associated with different physical locations on the automation system.

13. A method according to claim 12, wherein each different physical location relates to a location on a perimeter of the automation system.

14. A method according to claim 13 wherein the plurality of light displays are arranged along the perimeter and identified by each light display's location on the perimeter.

15. A method according to claim 12, wherein the automation system comprises a plurality of automation stations and each automation station comprises a perimeter configured to identify different physical locations on the automation station.

16. A method according to claim 12, wherein the visual display system is configured to provide an animated path indication to a location of the area of interest of the automation system.

17. A method according to claim 12, wherein the visual display system comprises a plurality of light strings and the light strings are configured to provide patterns associated with the state of the automation system and the location of the area of interest.

18. A method according to claim 12, wherein the visual display system is configured to provide a background state of the automation system and a foreground area of interest of the automation station.

19. A method according to claim 12, further comprising relaying, via a convertor, visual cue instructions from the execution device to the visual display system.

20. A system for visual state identification of an automation system, the system comprising:
a machine controller configured to monitor the automation system to determine a change in state of the automation system;
an execution device configured to receive input from the machine controller related to the change in state and determine a visual cue related to the change in state and a perimeter location identification associated with the change in state; and
a visual display system comprising a plurality of light displays wherein each of the light displays comprises a location identification associated with the perimeter location identification and wherein the visual display system is configured to selectively illuminate each of the plurality of light displays based on the location identification and the change in state of the automation system.

* * * * *